(12) United States Patent
Sandford (10) Patent No.: US 6,900,811 B2
(45) Date of Patent: May 31, 2005

(54) PROGRAMMABLE SLIDING WINDOW FOR IMAGE PROCESSING

(75) Inventor: Mark J. Sandford, Lake Forest, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 217 days.

(21) Appl. No.: 10/052,707

(22) Filed: Jan. 17, 2002

(65) Prior Publication Data

US 2002/0135586 A1 Sep. 26, 2002

Related U.S. Application Data

(60) Provisional application No. 60/262,572, filed on Jan. 18, 2001.

(51) Int. Cl.[7] .............................................. G09G 5/399
(52) U.S. Cl. ..................... 345/539; 345/536; 345/543; 345/548; 345/562
(58) Field of Search ................................ 345/536, 538, 345/562, 539, 548, 654, 543, 806; 715/781, 806; 711/171

(56) References Cited

U.S. PATENT DOCUMENTS

| | | | | |
|---|---|---|---|---|
| 4,954,819 A | * | 9/1990 | Watkins ...................... | 345/539 |
| 5,801,717 A | * | 9/1998 | Engstrom et al. ........... | 345/539 |
| 5,854,628 A | * | 12/1998 | Nakagawa ................... | 345/803 |
| 6,463,481 B1 | * | 10/2002 | Lupien et al. ................ | 710/22 |
| 6,631,316 B2 | * | 10/2003 | Stam et al. ................... | 701/36 |

* cited by examiner

Primary Examiner—Matthew C. Bella
Assistant Examiner—Hau Nguyen
(74) Attorney, Agent, or Firm—Blakely Sokoloff Taylor & Zafman; Judith A. Szepesi (57) ABSTRACT

A sliding window (block) system incorporating a methodology for providing a processor access to image data is described. In an exemplary embodiment, the system operates as follows. An image is received for processing that has a size that is too large for the processor to access directly. As a result, the sliding window system creates first, second, and third swappable windows (blocks) for accessing image data from the image; each windows is swappable so that any two are available within the memory space of the processor while a third is being loaded in a background memory. The system cycles through the three windows such that, at any given point in time, two of the three windows are affixed in the memory space of the processor as left and right adjacent windows, while the remaining or third window is being loaded in the background (e.g., in a DRAM) as a temporary shadow or background window. After the shadow window is loaded with appropriate image data, it is brought into the foreground (i.e., within the memory space of the processor) as the new right window. The prior (old) right window now becomes the new left window; the prior (old) left window now becomes a new shadow or background window. The process repeats as necessary, until all image data of the target image has been accessed/processed.

26 Claims, 4 Drawing Sheets

Initial condition, 5x5 filter will be processed centered on the third row, starting centered on the third column.

↓ Filter centered on 4th column

↓ Filter centered on 5th column

↓ Filter centered on 6th column

↓ Filter centered on 7th column

Filter centered on 8th column

↓ Filter centered on 9th column

↓ Filter centered on 10th column

↓ Filter centered on 11th column, left block no longer required and swapped out

Note that this block is identical to the 1st block, identical addressing and thus code can be used.

PROGRAMMABLE SLIDING WINDOW FOR IMAGE PROCESSING

RELATED APPLICATIONS

The present application is related to and claims the benefit of priority of the following commonly-owned provisional application(s): application Ser. No. 60/262,572 filed Jan. 18, 2001, entitled "Programmable Sliding Window for Image Processing", of which the present application is a non-provisional application thereof. The disclosure of the foregoing application is hereby incorporated by reference in its entirety, including any appendices or attachments thereof, for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to digital image processing and, more particularly, to improved techniques for accessing image data when processing (e.g., filtering) digital images.

2. Description of the Background Art

Today, digital imaging, particularly in the form of digital cameras, is a prevalent reality that affords a new way to capture photos using a solid-state image sensor instead of traditional film. A digital camera functions by recording incoming light on some sort of sensing mechanisms and then processes that information (basically, through analog-to-digital conversion) to create a memory image of the target picture. A digital camera's biggest advantage is that it creates images digitally thus making it easy to transfer images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, remove red-eye, change colors or contrast, and even add and delete elements. Digital cameras also provide immediate access to one's images, thus avoiding the hassle and delay of film processing. All told, digital photography is becoming increasingly popular because of the flexibility it gives the user when he or she wants to use or distribute an image.

In order to generate an image of quality that is roughly comparable to a conventional photograph, a substantial amount of information must be captured and processed. For example, a low-resolution 640×480 image has 307,200 pixels. If each pixel uses 24 bits (3 bytes) for true color, a single image takes up about a megabyte of storage space. As the resolution increases, so does the image's file size. At a resolution of 1024×768, each 24-bit picture takes up 2.5 megabytes. Because of the large size of this information, digital cameras usually do not store a picture in its raw digital format but, instead, apply compression technique to the image so that it can be stored in a standard compressed image format, such as JPEG (Joint Photographic Experts Group). Compressing images allows the user to save more images on the camera's "digital film," such as flash memory (available in a variety of specific formats) or other facsimile of film. It also allows the user to download and display those images more quickly.

Current memory architecture in widespread use for storing/processing digital images (e.g., synchronous DRAMs—SDRAMs) is optimized for sequential data access in a horizontal manner, such as page-based or row-based access. For example, in the SDRAM memory commonly employed in PCs, horizontal access may be achieved on the order of 7–10 nanoseconds. This speed results from a pre-fetch pipelining mechanism, which is optimized for fetching the next data element (e.g., machine word) in a given row ("page"). Vertical access (e.g., accessing a pixel value below), in contrast, requires around 120 nanoseconds, a ten-fold increase in access cost. This increased cost results from the time-intensive task of switching to another row of memory cells. Here, the underlying memory access mechanism must be reconfigured to switch to the next memory page to access the next group of bits.

One approach to mitigating the above limitation of current memory architecture is to employ alternative memory architecture—that is, forego use of RAM that is page oriented. One such example is static RAM (SRAM). Unfortunately, that approach has distinct disadvantages in terms of greatly increased cost, power requirements, and larger chip size. It is instead advantageous to find a solution that may be implemented using less-costly page-based memory architecture, if such a solution is possible.

Often in digital image processing, it is necessary to apply various two-dimensional filters, which may be of varying sizes and varying data access requirements. Accordingly, it would be advantageous to have an approach that supports random types of two-dimensional image processing applications. Traditionally, the foregoing has been addressed in terms of software-implemented techniques.

With DRAM architecture, it is easy to work in the horizontal but difficult to work in the vertical, due to the previously described problems encountered with page-oriented memory. Additionally, for digital imaging applications embodied in low-cost devices, one usually employs a small, low-cost processor with a limited address space. At the same time, however, the images to be processed are relatively large and easily exceed the scope of the processor's address space. To make a filter or image processing application as efficient as possible (e.g., operates in the least amount of time, with the lowest consumption of power), it is desirable to have a mechanism that provides image data in an easy to use format, rather than a format that requires a device to retrieve each element (e.g., pixel value) of the image data separately.

One approach to the problem is to provide a FIFO-based (i.e., first-in, first-out) solution, such as described in U.S. Pat. No. 5,748,178 to Drewry. In that approach, the system basically processes "FIFOs" of data. However, that approach does not address the general aspects of the problem described above as a FIFO-based approach constrains the number of implementations available. For example, for a three-line FIFO implementation, one is restricted to performing filters that operate on three vertical elements. Further, for purely FIFO-based implementations, a system must take the incoming data and must pre-implement the mechanisms for the width of the filter. There is no easy way to process the image vertically, such as moving a horizontal FIFO filter in the vertical space to deal with vertical elements.

Because of the foregoing limitations of existing approaches, a better solution is sought. What is needed is an easy-to-implement mechanism that is efficient in terms of image processing speed and power consumption, yet does not require expensive or esoteric hardware. Further, the solution should have general applicability to image processing—that is, it should not place too many constraints or restrictions on the nature or size of the image data. The present invention fulfills this and other needs.

GLOSSARY

The following definitions are offered for purposes of illustration, not limitation, in order to assist with understanding the discussion that follows.

ASIC: Short for Application Specific Integrated Circuit, a chip designed for a particular application. ASICs are built by connecting existing circuit building blocks in new ways. Since the building blocks already exist in a library, it is much easier to produce a new ASIC than to design a new chip from scratch.

DMA: Abbreviation of direct memory access, a technique for transferring data from main memory to a device without passing it through the CPU. Computers that have DMA channels can transfer data to and from devices much more quickly than those without a DMA channel.

SRAM: Abbreviation for static random access memory. SRAM retains data bits in its memory as long as power is being supplied. Unlike dynamic RAM (DRAM), which stores bits in cells consisting of a capacitor and a transistor, SRAM does not have to be periodically refreshed. Static RAM provides faster access to data.

SUMMARY OF THE INVENTION

The present invention comprises a sliding window (block) system incorporating a methodology for providing a processor access to image data. The processor itself has a memory space of a given size. In an exemplary embodiment, the system operates as follows. An image is received for processing that has a size that is too large for the processor to access directly. (The invention also works for images that are not too large for the processor to access directly.) As a result, the sliding window system creates first, second, and third swappable windows (blocks) for accessing image data from the image; each window is swappable so that any time two are available within the memory space of the processor while a third is being loaded in background memory not visible to the processor. If desired, additional active windows and additional background windows may be employed in a straightforward manner, in accordance with the present invention.

After initializing two of the windows with image data from the image and affixing those windows in the memory space of the processor as left and right adjacent windows, the system provides access to image data by performing substeps of:
 i. loading the window that is not affixed in the memory space of the processor with image data from the image, the window temporarily comprising a shadow window that is loaded in the background memory,
 ii. swapping the windows such that the left window is removed from the memory space of the processor, the right window now becomes the left window in the memory space of the processor, the shadow window now becomes the right window in the memory space of the processor, and the left window removed from the memory space of the processor now becomes a temporary shadow window to be loaded in the background memory, and
 iii. providing access to the then-current left and right windows in the memory space of the processor for supporting image processing of said image.

Thus, as shown above, the system cycles through the three windows such that, at any given point in time, two of the three windows are affixed in the memory space of the processor as left and right adjacent windows, while the remaining or third window is being loaded in the background (e.g., from an external DRAM memory) as a temporary shadow or background window. After the shadow window is loaded with appropriate image data and the left window data is no longer needed, it is brought into the foreground (i.e., within the memory space of the processor) as the new right window. The prior (old) right window now becomes the new left window within the memory space of the processor; the prior (old) left window now becomes a new shadow or background window (i.e., is no longer within the memory space of the processor). These substeps may be repeated as necessary (e.g., as a loop operation), until all of the image data of the target image has been accessed/processed.

An apparatus, constructed in accordance with the present invention, for facilitating digital image processing includes, in one embodiment, multiple two-dimensional image storage elements, including active and background ones; a first control mechanism to temporarily map some of the two-dimensional image storage elements into an address space of a processor, whereupon those two-dimensional image storage elements become active in the address space of the processor; a mechanism to background load one of the two-dimensional image storage elements that is not currently active in the address space of the processor; and a second control mechanism to swap in the two-dimensional image storage element that has been background loaded into the address space of the processor, whereupon that two-dimensional image storage element becomes active in the address space of the processor.

DETAILED DESCRIPTION OF A PREFERRED EMBODIMENT

The following description will focus on the presently preferred embodiment of the present invention, which may be implemented in a low-cost ASIC (application-specific integrated circuit) chip. The present invention, however, is not limited to just ASIC-based implementations. Instead, those skilled in the art will find that the present invention may be advantageously embodied in other environments, including, for example, a field programmable gate array (FPGA) chip. Therefore, the description of the exemplary embodiments that follows is for purposes of illustration and not limitation.

I. ASIC-Based Implementation

The present invention may be implemented on an ASIC. An ASIC is an integrated circuit or "chip" that has been built for a specific application. Integrated circuits are traditionally designed with general-purpose functions that allow designers to design systems in the form of integrated circuit boards by connecting integrated circuits with selected functions to one another. For example, most integrated circuits have general functions, such as combinational logic, shift registers, and the like, and are connected to one another on circuit boards. Designers may use ASIC to consolidate many integrated circuits into a single package thereby reducing circuit board size requirements and power consumption. An ASIC implements custom functionality according to a description, which is provided in an abstract technology-independent fashion for instance using a Hardware Description Language (HDL), such as VHDL (Very High Speed Integrated Circuit Hardware Description Language) or Verilog Hardware Description Language.

ASICs may incorporate programmable logic arrays, field programmable gate arrays, cell based devices, and fully custom designed devices. ASICS may include such general function circuits that are connected to perform specific applications as systems, such as, a disk controller, a communications protocol, a bus interface, a voice coder, and the like. An ASIC may include on a single integrated circuit the circuitry that is typically built on a circuit board. ASIC devices are available from a variety of suppliers, including Fujitsu, Hyundai Electronics America, and Texas Instruments.

The use of an ASIC-based implementation is presented for purposes of illustrating the basic underlying architecture and operation of the present invention. An ASIC-based implementation is not necessary to the invention, but is used to provide a framework for discussion. Instead, the present invention may be implemented in any type of circuitry capable of supporting the processes of the present invention presented in detail below.

II. Programmable Sliding Window Access for Image Processing

A. Introduction

The present invention provides a programmable sliding window (block) access approach that directly addresses the problem of processing a large image (e.g., megapixel image containing millions of pixels) with a digital signal processor (DSP) that only has a relatively small (e.g., 16-bit) address space (e.g., providing only 64K word access). With such a small address space, a DSP cannot directly manipulate large images. However, the improved access approach of the present invention provides an efficient, cost-effective technique for providing access to image data and increased performance by allowing fast local access rather than slower accesses to external memory.

In image processing applications, there exist various potential implementations of different filters and different applications within image processing where two-dimensional data is desired but the accesses to that two-dimensional data will not necessarily be the same size. For example, a particular application may require a 3×3 filter, a 5×5 filter, or a 7×7 filter—that is, require multiple different possible sizes. Notwithstanding this problem, the sliding window access approach of the present invention has been designed to provide a generic, easy mechanism for a DSP programmer to have access to large images in an efficient manner.

B. Basic Design

The present invention provides a sliding-window methodology having, in a preferred embodiment, three 8×8 pixel windows (blocks), two of which (e.g., organized as at least one 16×8 pixel block) are always available and in the local memory space of the DSP. The third window, referred to as a "shadow element," is prepared in the background by a DMA process but is not immediately accessible to the DSP. Each of the windows is "swappable" so that each can appear at different address spaces of the DSP, two of which are always available (at a given respective addresses of the DSP address space). In other words, with three 8×8 blocks of memory, two blocks are at any one time fixed in address space with respect to the DSP and the third one can be loaded in the background from a DRAM or any large external memory. The design provides two adjacent windows, 8×8 each, with addresses 0 to 15 across on the first line, 16 through 31 on the second line, and so on, thereby totaling 128 possible pixels for that particular embodiment.

The system includes a DMA engine that can be programmed with the width of the image together with an amount to shift down (vertically), after the righthand boundary of the image is reached. When shifting horizontally, the windows or blocks are abutted (i.e., contiguous data). Vertical movement is configurable so that any degree of overlap (or no overlap) can be specified. Therefore, once a horizontal access (of a given row) has completed, vertical access can begin with a specified amount of overlap for the next row.

C. Architecture and Operation

Figure 1:
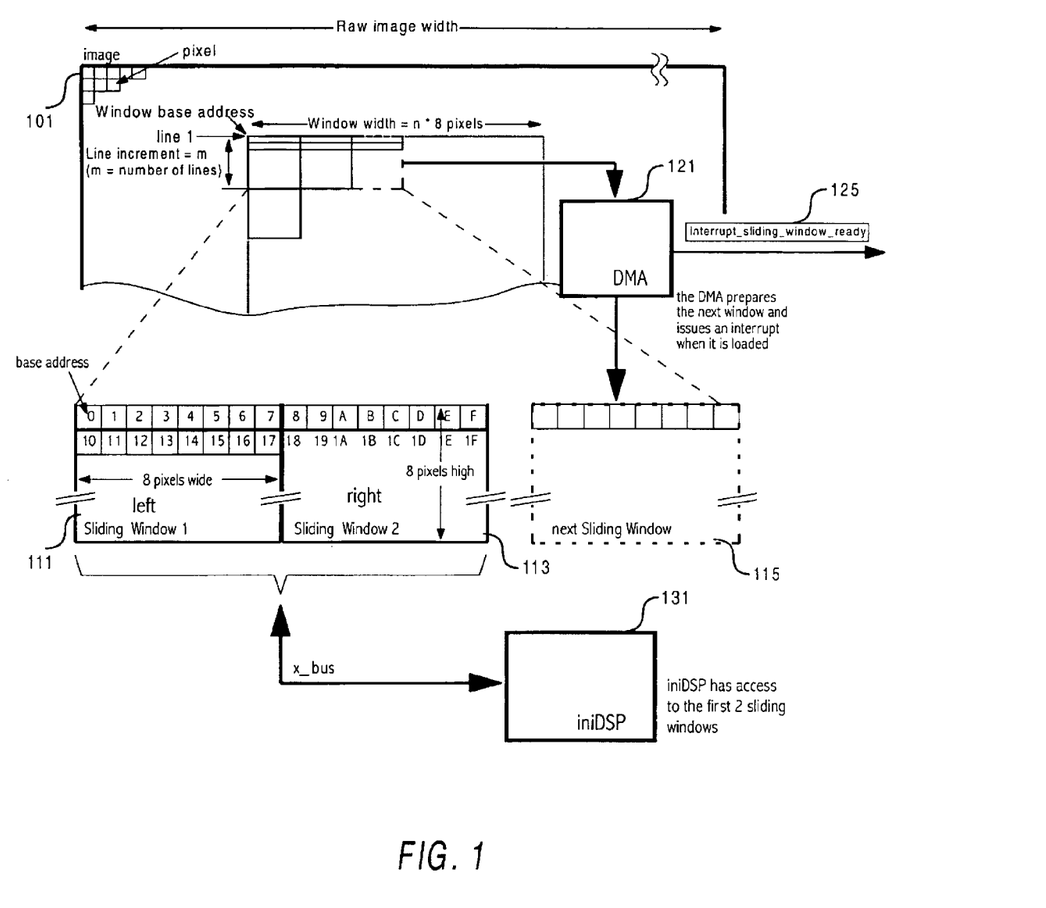
FIG. 1 is a block diagram illustrating an ASIC-implemented circuit providing a sliding window (block) methodology for accessing image data.

As illustrated in FIG. 1, the sliding window technique provides first and second 8×8 pixel windows to the DSP (shown as window 111 and window 113, respectively), while a third window 115 is prepared in the background (i.e., not in the address space of the DSP). An interrupt 125 is generated to the DSP 131 when the DMA 121 loading has finished. The loading operates, in the currently preferred embodiment, from upper left to lower right pixel (shown at 101). The two foreground windows employed by the currently preferred embodiment form one 16×8 pixels window, connected to the DSP 131, while the third one is invisible and connected to the DMA 121.

To configure the sliding window access, the following four registers are programmed:

Raw image width: The width of the raw image in multiples of eight pixels.

Window base address: The address of the upper left corner of the window.

Window width: The window width in multiples of eight pixels.

Line increment: The vertical increment in number of lines. The sliding window access can have overlap for the vertical step (i.e., 0–15 lines can be added to the current base address), but the horizontal step is, in the preferred embodiment, always eight pixels. The window being read is configured by width and upper left corner; the height is not relevant.

Although there could potentially be a way to employ a very complex address generator that could be programmed to handle semi-random access to data, such an approach is unattractive as it would typically entail substantial hardware (without any guarantee that every possible case could be covered). Therefore, in the preferred embodiment, the system loads from the top left of the image, as an 8×8 block, the multiple of 8 is an efficient data size for the DRAM devices used in this embodiment. This is followed by moving down a row, and the top two adjacent memory blocks would be filled in from the top left portion of the image. In this manner, a filter may be run with two-dimensional data yet stay within a fixed address space in the DSP providing a simple programming model to access local data. As the system performs a two-dimensional filter operation, it simply slides that filter across these two windows. Filter processing movement can also be done vertically, or both horizontally and vertically, within the limits of an 8×8 window (or other size suitable for a given digital image processing application of interest).

In the currently preferred embodiment, the DSP 131 may be Inicore's iniDSP (available from Inicore, Inc. of Newark, Calif.) or other similar processors from other various DSP vendors (e.g., Motorola, Lucent, Texas Instruments, or the like). Further, the DSP can also be replaced by a general-purpose processor (e.g., Intel-based or Motorola-based), or even a DMA engine. DSPs are preferred as in general they contain DAG (data address generation) units that are optimized for this type of (e.g., signal and image-based) data movement, yet remain programmable. General-purpose processors, on the other hand, might be preferred in low cost applications in which a DSP does not provide enough flexibility (and a two processor implementation would not be cost effective). A "hardwired" DMA engine may provide the fastest implementation, but has the disadvantage of lack of programmability.

Figure 2:
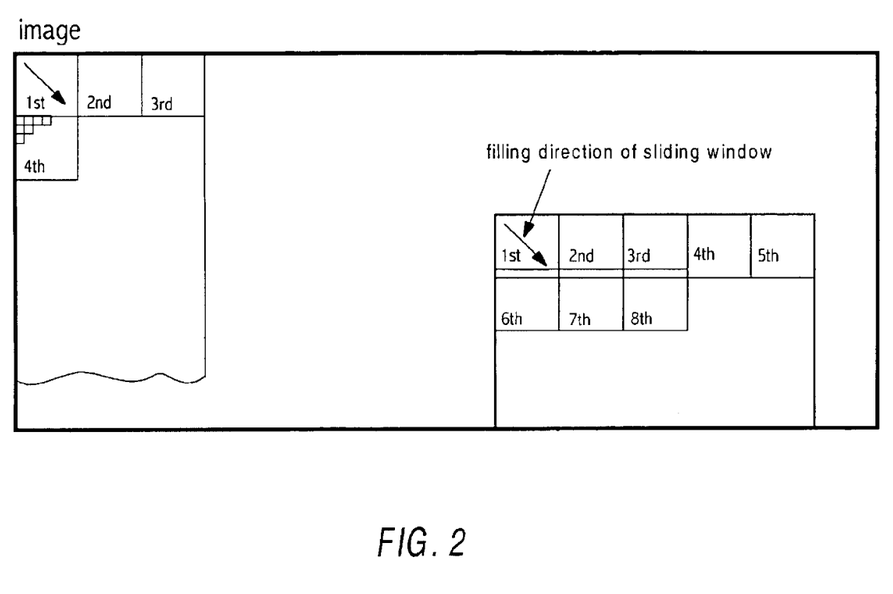
FIG. 2 is a block diagram illustrating image data processing using sliding window access methodology, practiced in accordance with the present invention.

FIG. 2 illustrates image processing using the sliding window access. The first window has a window start address of '0' and a width of 3 (i.e., 3*8pixels). The overlap is 8 * raw image width, i.e., as soon as the sliding window reaches the right side of the window then the next sliding window is on the left side and eight lines further down. The second window has a window start address of x and a width of 5. The overlap is 7 * raw image width, i.e., seven lines down. In this manner, the whole image may be processed.

D. Handling of Boundary Conditions

Recall that a lot of image processing operations are two dimensional in nature. With a fixed sized memory, one encounters problems crossing boundaries. Dealing with those boundary conditions can involve very complex requirements for address generation to make sure the right data is available. All those extra calculations for address generation are very time consuming and require complex hardware.

Consider, for instance, a basic 5×5 filter implemented with the sliding-window access approach of the present invention. In a 5×5 filter, there is a center element to be filtered, with two pixels above, two pixels below, two pixels to the right, and two pixels to the left, forming a diamond shape. If a fixed buffer was used with two-dimensional filters, one encounters the problem of boundary conditions as the data is limited to a fixed block and access outside this block is not available. The data can be completely reloaded at the cost of many redundant memory accesses. When a boundary is encountered, the system must take data from another buffer or perform separate accesses, such that the system must keep track of (potentially) multiple memory blocks or buffers (some of which may include random addresses). This leads to the problem of greatly increased complexity and amount of programming logic required for processing, as well as the difficulty of handling special cases.

As the filter processing progresses from the left window into the right window, crossing the boundary between the left and right window, such that the filter exists entirely in the right window; the data in the left window is no longer required. It is then possible to use the third window, which is a shadow buffer (not directly accessible to the DSP having been loaded in the background, with data to the right of the current right window). It may be swapped in such that the left window now becomes the shadow, what was the right window now becomes the left, and what was the shadow now becomes the right. The sliding window now effectively contains the portion of the image shifted over eight pixels from the previous location.

One benefit of this sliding window mechanism is that the window into the larger image is at a fixed location within the DSP's 131 memory space. This means that while the sliding window contains different data than before, the new data is at the location of the old data and as such code may be written that can be reused as the image is shifted without having to calculate new address locations as the image position changes. In this manner, the DSP programmer need only write enough code to cover the sliding window area (16×8 pixel locations) portion of the image, rather than having to create a less efficient application that recalculates memory locations as the filter progresses across the image. The processor DMA implementation can move the access window across the image and to the right and down to allow full access to the entire image in an automated manner without further code manipulation. Thus, one need only have to program a small segment and then implement a programming code loop to cover the entire image. The DMA engine is programmed to the image size and the required overlap so that full coverage of data is available for filtering without any need for the programmer to deal with memory buffer boundary conditions.

E. Example: 5×5 Filter

Figure 3:
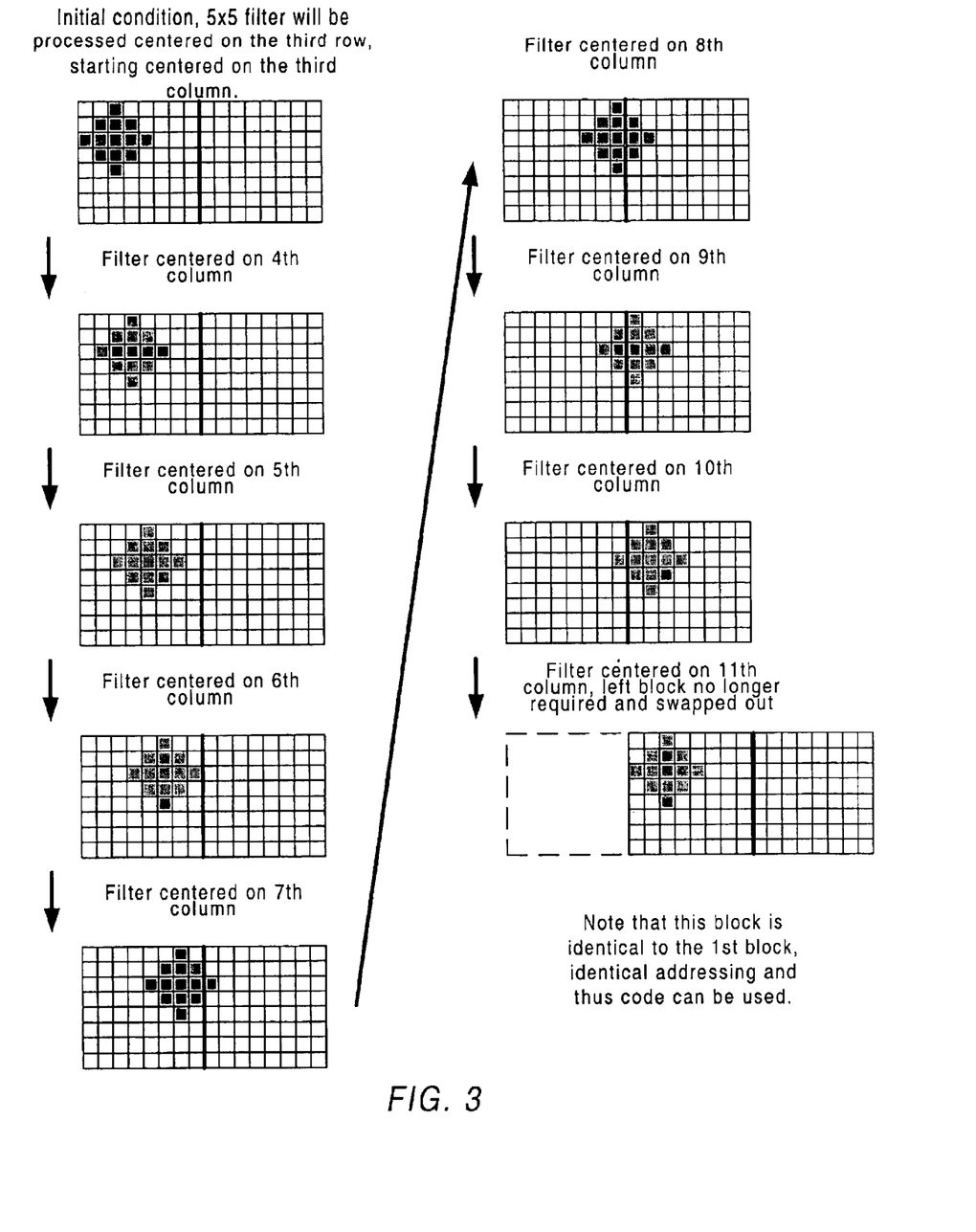
FIG. 3 illustrates processing conducted in accordance with the present invention, using an example of a 5×5 filter.

FIG. 3 illustrates processing conducted in accordance with the present invention, using an example of a 5×5 filter. The system starts three lines down and three lines in, in order to have enough data to process that filter. The 5×5 filter can be moved down and to the right within a given memory block. Further, as there are two sequential blocks employed, the system is able to move across the pair of windows, crossing the boundary between the two blocks without any special accesses. In the 5×5 filter case, the first two rows and the bottom two rows cannot be processed, nor can the extreme left be processed. However, as the filter crosses from the left to block into the right block, the blocks can be switched such that the filter, that had existed in the right window, now appears in the left and may continue to shift towards the right, switching each time the center boundary is crossed. In this manner the DSP 131 never has to deal with the boundary conditions of the buffer.

FIG. 3 also demonstrates that, after eight filter operations, 5×5 filter's data of interest has moved completely from the left window into the right window, such that a window swapping operation can take place. After this swap, it should be noted, the ninth iteration of the filter appears exactly the same as the first iteration, using the same address as the first case, but exists eight columns over in the image. Thus, it is evident that a programmer using this system only has to write eight implementations of the filter, and after a window swap operation can reuse the same code. In a traditional system the programmer would be forced to continuously recalculate addresses of the data to be filtered at a significant overhead. That is not required in the system described herein. DSPs often include DAG (data address generation) units that help calculate addresses for simple linear filter operations; no devices are known to exist to automatically generate two-dimensional filter addresses. As the address calculation is not required, there is a significant performance increase. In using this method there is also a significant decrease in total memory access as no redundant access are required for horizontal image processing applications.

The system can continuously process the image data, as the entire requirements of the filter are in the right block (as it is swapped in from the shadow block). Here, the system no longer needs the data that is in the now-left block; the system swaps blocks so that what was the right block now becomes the new left block, what was the shadow block now becomes the new right block. The system loads the new shadow block in the background, that was previously the (old) left block. In this manner, the approach uses the memory space of the DSP, with the blocks arranged and swapped so that the filter can be applied to the correct neighborhood of pixels for achieving the desired filter.

In the above example a 5×5 filter is used that uses two pixels above, two pixels below and two pixels to the right and left, about the center of the filter. As discussed above this requires that the filter to start operation centered on the third row and third column. The nature of the sliding window allows easy filter movement across the image to the right, as has been described above. It is also possible to process the filter centered on the fourth, fifth and sixth rows, the other rows cannot be processed as there is insufficient data above or below the center row with the currently available data. In this manner a 5×5 filter within the 8×8 window can process the center four rows. To allow for processing of the sixth and seventh rows the vertical line increment value should be programmed to a value of 5. In the initial configuration eight rows of the window block represent the eight topmost rows of the image. When the sliding window reaches the right boundary, the window is now loaded with data from the left of the image with the upper most row of the windowing block, being the fifth row such that the seventh row can now be processed with two rows of data available above. The line increment value can thus be used to shift the window vertically relative to the original image allowing full coverage of the image. Given any filter or image processing size, the line increment value can be programmed to an appropriate value to allow full and efficient access to the entire image. This mechanism saves the programmer from having to write code to deal with boundary conditions, allowing the full processing power to be applied to the required image processing application.

F. Programming

Figure 4:
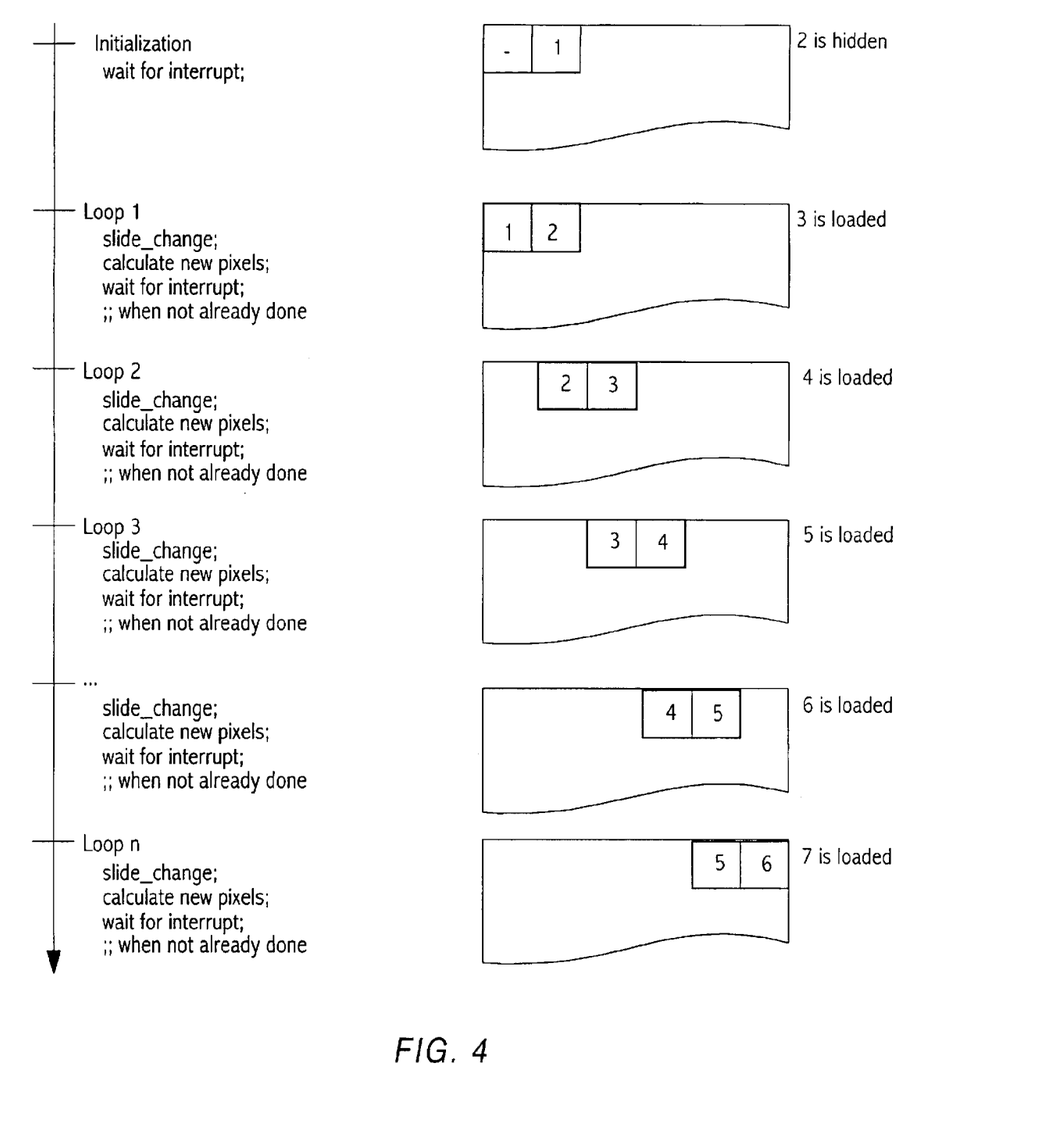
FIG. 4 is a block diagram (with accompanying command flow diagram) illustrating how the sliding window access is programmed.

FIG. 4 illustrates how the sliding window (block) access is programmed.

1. Initialization

At the outset, the sliding window access process is first initialized. The process can be initialized by writing a '1' to bit 0 of a sliding window control (SLW_CTRL) register. This will load in the background the window 1 and 2 and generate an interrupt to mark the end of load process. Note that after this initialization, the 16×8 pixels window is not yet ready to be processed. First, a slide_change action is programmed to load the third window and set the first and second windows in place. This approach allows the DSP programmer to program a loop statement that does not have to take care about start conditions (after initialization).

2. Continuous Readout

Loops 1 through n illustrate continuous readout of image data using the above-mentioned loop statement. As shown, each loop statement includes a slide_change instruction or command. The command performs two tasks. First, the former window that was hidden and loaded by DMA in the background (e.g., window 3 at loop 2) now shows up in the right position (addresses 0x08 . . . 0x1f, etc.); the window that was at this place previously (e.g., window 2) is moved into the left position (addresses 0x00 . . . 0x07, etc.). The window that was at that place (e.g., window 1) is now hidden. Second, the hidden window (e.g., window 4) is loaded with the next block in the background. This action is terminated with an interrupt, as illustrated.

G. Register Configuration

The following table summarizes the functionality of each of the registers (and relevant values) for the currently preferred embodiment.

| Register | Size | Access | Description |
| --- | --- | --- | --- |
| SLW_RAW_WDT | 9 | R/W | This is the raw image width in multiples of 8 pixels (0-511 * 8 pixels) '0' is not a valid configuration |
| SLW_BASE_L | 16 | R/W | Sliding window base address low word, bits [18:3] |
| SLW_BASE_H | 5 | R/W | Sliding window base address high word, bits [23:19] |
| SLW_WIDTH | 9 | R/W | This is the width of the sliding window in multiples of 8 pixels. (SLW_WIDTH = 3 -> 24 pixels wide) '0' is not a valid configuration |
| SLW_LINE_INCR | 4 | R/W | This is the number of lines that are added to the base address when the right side of the sliding window is reached. Values go from 0–15 |
| SLW_CTRL | [0] | W | Initialize the sliding windows '0': no action '1': load the first 2 windows |
| | [1] | R | Busy '0': DMA is idle '1': DMA is busy and no Next command may be issued |
| | [2] | W | Next window '0': no action '1': shift the window 8 pixels to the right, or the number of lines down if the right side of the window is reached. It also triggers the DMA to load the next sliding window. This command cannot be executed while Busy is active. The next sliding window is visible to the DSP immediately afterwards. |

While the invention is described in some detail with specific reference to a single-preferred embodiment and certain alternatives, there is no intent to limit the invention to that particular embodiment or those specific alternatives. A more generalized solution might include the ability to slide the data windows in a vertical manner as opposed to, or in addition to, the current horizontal implementation The 8×8 window size matched the requirement for this specific implementation, but other applications may require or be optimal at another block size. Those skilled in the art will appreciate that modifications may be made to the preferred embodiment without departing from the teachings of the present invention.

What is claimed is:

1. An improved method for providing a processor access to image data, said processor having a memory space of a given size, the method comprising:

receiving an image for processing;

creating first, second, and third swappable windows for accessing image data from said image, said windows being swappable so that any two are available within the memory space of the processor while a third is being loaded in a background memory;

after initializing two of the windows with image data from said image and affixing those windows in the memory space of the processor as left and right adjacent windows, providing access to image data by performing substeps of:
  i. loading the window that is not affixed in the memory space of the processor with image data from said image, said window temporarily comprising a shadow window that is loaded in the background memory,
  ii. swapping said windows such that the left window is removed from the memory space of the processor, the right window now becomes the left window in the memory space of the processor, the shadow window now becomes the right window in the memory space of the processor, and the left window removed from the memory space of the processor now becomes a temporary shadow window to be loaded in the background memory, and
  iii. providing access to the then-current left and right windows in the memory space of the processor for supporting image processing of said image.

2. The method of claim 1, repeating substeps i–iii until the entire image has been processed.

3. The method of claim 1, wherein said image comprises a megapixel image.

4. The method of claim 1, wherein said processor comprises a digital signal processor (DSP) having a small address space relative to the image.

5. The method of claim 1, wherein each said window comprises an 8×8 pixel window.

6. The method of claim 1, wherein any two windows present in the address space of the processor are organized as a 16×8 pixel block.

7. The method of claim 1, wherein the background memory comprises a DRAM.

8. The method of claim 1, wherein the background memory has an address space that is not directly accessible to the processor.

9. The method of claim 1, wherein the image has a size that is too large for the processor to access directly.

10. The method of claim 1, wherein the image has a size that is not too large for the processor to access directly.

11. The method of claim 1, wherein each of the values within each window is at a fixed memory address location relative to the window, as the window slides across the image.

12. The method of claim 1, wherein the image is processed by vertically sliding the windows across the image.

13. The method of claim 1, wherein the image is processed by horizontally sliding the windows across the image.

14. The method of claim 1, wherein the image is processed by both vertically and horizontally sliding the windows across the image.

15. The method of claim 1, wherein each said window comprises a pixel window having a bit width appropriate for a digital imaging processing application of interest.

16. The method of claim 15, wherein the digital imaging processing application of interest includes digital filtering of an image of a given size.

17. The method of claim 1, further comprising:

providing additional windows, so that the method may affix additional windows in the memory space of the processor at a given point in time.

18. The method of claim 1, further comprising:

providing additional windows, so that the method may background load additional windows in the memory space of the processor at a given point in time.

19. An apparatus for facilitating digital image processing, the apparatus comprising:

multiple two-dimensional image storage elements, including active and background ones, wherein the two-dimensional image storage elements comprise at least two active windows that are active in an address space of a processor and at least one shadow window that is not active in the address space of the processor;

a first control mechanism to temporarily map some of the two-dimensional image storage elements into the address space of the processor, whereupon those two-dimensional image storage elements become active in the address space of the processor;

a mechanism to background load one of the two-dimensional image storage elements that is not currently active in the address space of the processor; and a second control mechanism to swap in the two-dimensional image storage element that has been background loaded into the address space of the processor, whereupon that two-dimensional image storage element becomes active in the address space of the processor.

20. The apparatus of claim 19, wherein, upon activation of said second control mechanism, one of the active two-dimensional image storage elements is no longer active in the address space of the processor.

21. The apparatus of claim 19, wherein said mechanism to background load includes a DMA engine.

22. The apparatus of claim 21, wherein said DMA engine issues an interrupt to signal the processor when background loading has completed.

23. The apparatus of claim 19, wherein said processor comprises a digital signal processor (DSP).

24. The apparatus of claim 19, wherein said at least two active windows comprise left and right active windows.

25. The apparatus of claim 19, wherein after a shadow window is loaded with appropriate image data and brought into the address space of the processor, the then-current right active window now becomes a new left active window, the prior left window now becomes a new shadow window, and the just-loaded shadow window now becomes a new right active window.

26. The apparatus of claim 19, wherein the digital image is processed by vertically sliding the windows across the digital image.

* * * * *